(12) United States Patent
Lai et al.

(10) Patent No.: US 7,514,825 B2
(45) Date of Patent: Apr. 7, 2009

(54) LINEAR MOTOR COOLING APPARATUS WITH AIR AMPLIFICATION

(75) Inventors: Wing Chiu Derek Lai, Hong Kong (CN); Cheuk Wah Chester Tang, Hong Kong (CN); Yen Hsi Terry Tang, Hong Kong (CN); Ming Lok Benjamin Yeung, Hong Kong (CN)

(73) Assignee: ASM Assembly Automation Ltd., Hong Kong (HK)

( * ) Notice: Subject to any disclaimer, the term of this patent is extended or adjusted under 35 U.S.C. 154(b) by 389 days.

(21) Appl. No.: 11/442,886

(22) Filed: May 30, 2006

(65) Prior Publication Data

US 2007/0278864 A1 Dec. 6, 2007

(51) Int. Cl.
*H02K 41/00* (2006.01)

(52) U.S. Cl. .................................... 310/12

(58) Field of Classification Search .............. 310/12, 310/52, 13, 14, 53–59
See application file for complete search history.

(56) References Cited

U.S. PATENT DOCUMENTS

| 5,834,862 | A | 11/1998 | Hartzell, Jr. .................. 310/12 |
| 6,992,410 | B2 * | 1/2006 | Chen et al. ................... 310/52 |
| 2004/0217656 | A1 * | 11/2004 | Chen et al. ................... 310/12 |

* cited by examiner

*Primary Examiner*—Chandrika Prasad
(74) *Attorney, Agent, or Firm*—Ostrolenk, Faber, Gerb & Soffen, LLP

(57) ABSTRACT

A cooling apparatus is provided for a linear motor that comprises a coil assembly and a magnet assembly, wherein the coil assembly generates heat during operation. The cooling apparatus comprises a compressed air inlet positioned to discharge compressed air in a direction directly towards a gap between the coil assembly and magnet assembly, and an inclined surface extending from the compressed air inlet and sloping at an obtuse angle away from the discharge direction of the compressed air. The compressed air inlet is configured to discharge the compressed air at a sufficient velocity so as to entrain atmospheric air along the inclined surface to amplify the compressed air that is discharged.

18 Claims, 3 Drawing Sheets

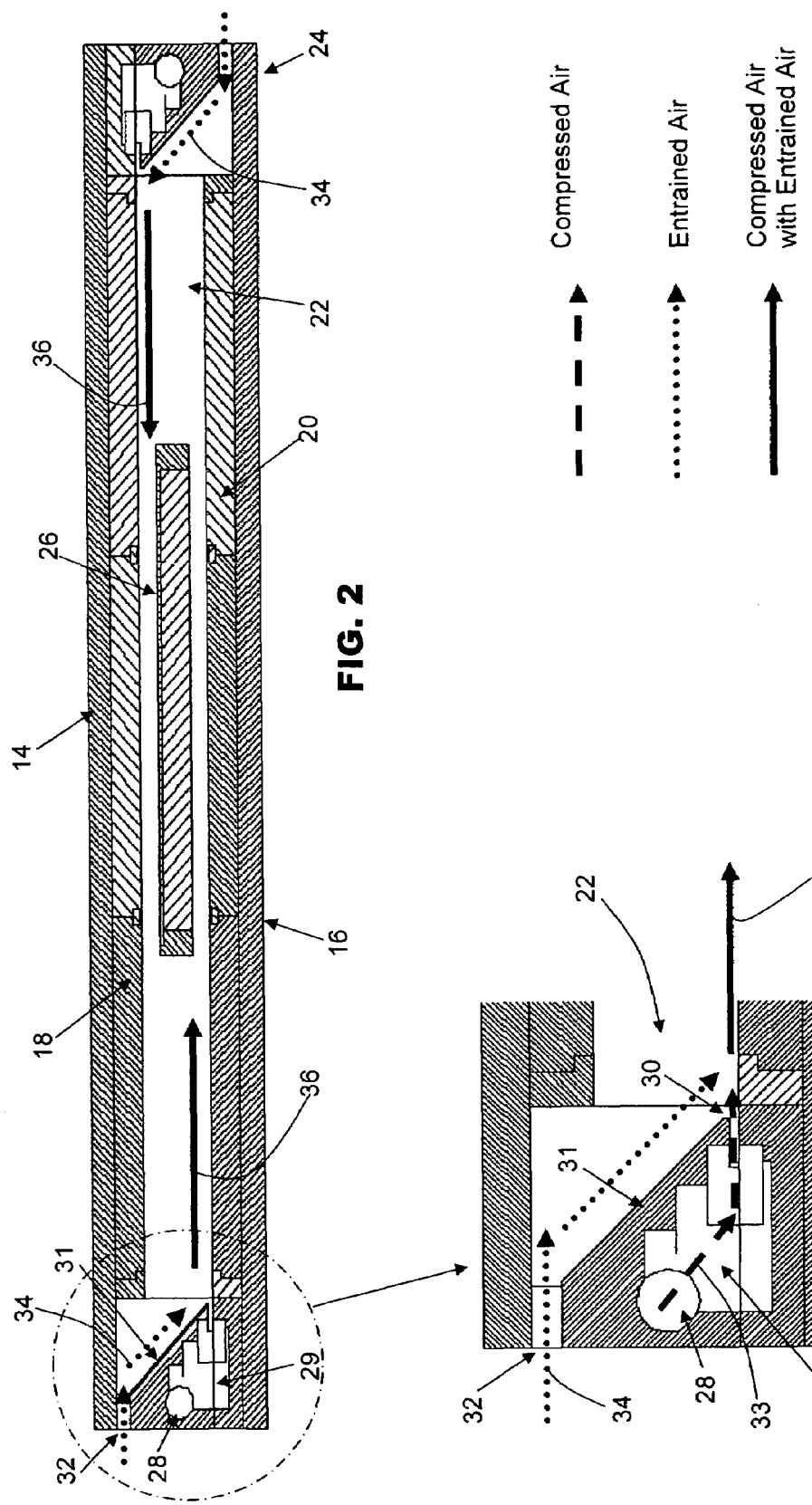

LINEAR MOTOR COOLING APPARATUS WITH AIR AMPLIFICATION

FIELD OF THE INVENTION

The invention relates to an apparatus for cooling linear motors that are typically used as actuators for positioning mechanisms, and in particular for generating cooling air to cool the current-carrying coils comprised in such linear motors.

BACKGROUND AND PRIOR ART

Linear motors are commonly used in semiconductor assembly equipment as a fast and accurate means to drive mechanical parts as they can provide relatively higher system performance as compared to rotary servo motors that are coupled with rotary to linear conversion mechanisms. This is due to the elimination of added inertia, friction, compliance and backlash that typical rotary-to-linear mechanisms have. High force density, excellent response and high reliability are some advantages of brushless linear motors.

A linear motor comprises permanent magnets that are arranged to form a magnetic field and a coil assembly that is disposed within the magnetic field which is configured for carrying a current. Either the set of permanent magnets or the coil assembly is typically kept stationary while the other component is configured to be movable relative to it in order to drive a payload.

A main source of heat generation in a linear motor occurs in its force-producing coil assembly, and this often places a heat generator in close proximity to the payload. Furthermore, in conventional linear motors, the gaps allowed between the coil assembly and the permanent magnets are usually very small to maximize efficiency, resulting in heat being trapped between the respective surfaces of the coil assembly and the permanent magnets. In high accuracy applications, this will be a concern since dimensional stability is affected by changing ambient thermal conditions. In addition to the moving payload, the system's own components such as guides or feedback may react negatively to elevated temperatures and lead to safety issues or even failure of the linear motor.

It is thus necessary to implement an apparatus to prevent such adverse effects. Providing a thermal insulator between the coil assembly and the rest of the system may be one approach, but this might significantly de-rate the motor due to effective loss of its heat sink. Therefore, many linear motors are often offered with internal air cooling.

One type of air cooling apparatus that has been implemented in the prior art to cool linear motors is described in U.S. Pat. No. 5,834,862 entitled "Linear Motor Cooling System". A cooling system is described therein for a closely coupled linear motor including a moving coil mounted for movement on a stator core. A nozzle comprising a base member and a cover plate is mounted on one end of the moving coil for producing a pair of high velocity sheets of air which are directed horizontally over the surface of the exposed turns so as to rapidly cool and stabilize the temperature of the coils.

However, these high velocity sheets of air are generated in directions that are perpendicular to the gaps between the coil frame and the magnet assembly, and not directly into the gaps. The sheets of air are instead made to traverse curvatures in the coil frame before entering the gaps. This approach of initially generating the air-flow perpendicular to the gaps is likely to result in the loss of cooling air into the atmosphere while the cooling air traverses the curvature of the frame. This is especially so when the radius of curvature of the frame is small, and would in turn reduce the amount of cooling air that is available to enter the gaps and pass over the heated coils. The cooling effect would thus be less efficient. It would be advantageous to generate cooling air directly into the gaps between the coils and the permanent magnets, while at the same time amplify the cooling air flow.

SUMMARY OF THE INVENTION

It is thus an object of the invention to seek to provide a cooling apparatus for linear motors that generates cooling air flow directly into the gaps between the coil assembly and magnet assembly of the linear motor.

It is a further object of the invention to amplify the cooling air that flows into the said gaps by entraining atmospheric air together with the generated cooling air flow.

According to a first aspect of the invention, there is provided a cooling apparatus for a linear motor comprising a coil assembly and a magnet assembly, the cooling apparatus comprising: a compressed air inlet positioned to discharge compressed air in a direction directly towards a gap between the coil assembly and magnet assembly; and an inclined surface extending from the compressed air inlet and sloping at an obtuse angle away from the discharge direction of the compressed air; wherein the compressed air inlet is configured to discharge the compressed air at a sufficient velocity so as to entrain atmospheric air along the inclined surface to amplify the compressed air that is discharged. According to a second aspect of the invention, there is provided a method for cooling a linear motor comprising a coil assembly and a magnet assembly, comprising the steps of: providing a compressed air inlet and arranging it to discharge compressed air in a direction directly towards a gap between the coil assembly and magnet assembly; providing an inclined surface extending from the compressed air inlet and sloping at an obtuse angle away from the discharge direction of the compressed air; and discharging compressed air directly towards the gap at a sufficient velocity so as to entrain atmospheric air along the inclined surface to amplify the compressed air that is discharged.

It will be convenient to hereinafter describe the invention in greater detail by reference to the accompanying drawings. The particularity of the drawings and the related description is not to be understood as superseding the generality of the broad identification of the invention as defined by the claims.

BRIEF DESCRIPTION OF THE DRAWINGS

Examples of cooling apparatus in accordance with the invention that may be used to cool linear motors will now be described with reference to the accompanying drawings, in which:

FIG. 2 is a cross-sectional view of the linear motor incorporating the cooling apparatus according to the first preferred embodiment of the invention;

FIG. 3 is an enlarged cross-sectional view of the cooling apparatus illustrated in FIG. 2;

DETAILED DESCRIPTION OF THE PREFERRED EMBODIMENT OF THE INVENTION

Figure 1:
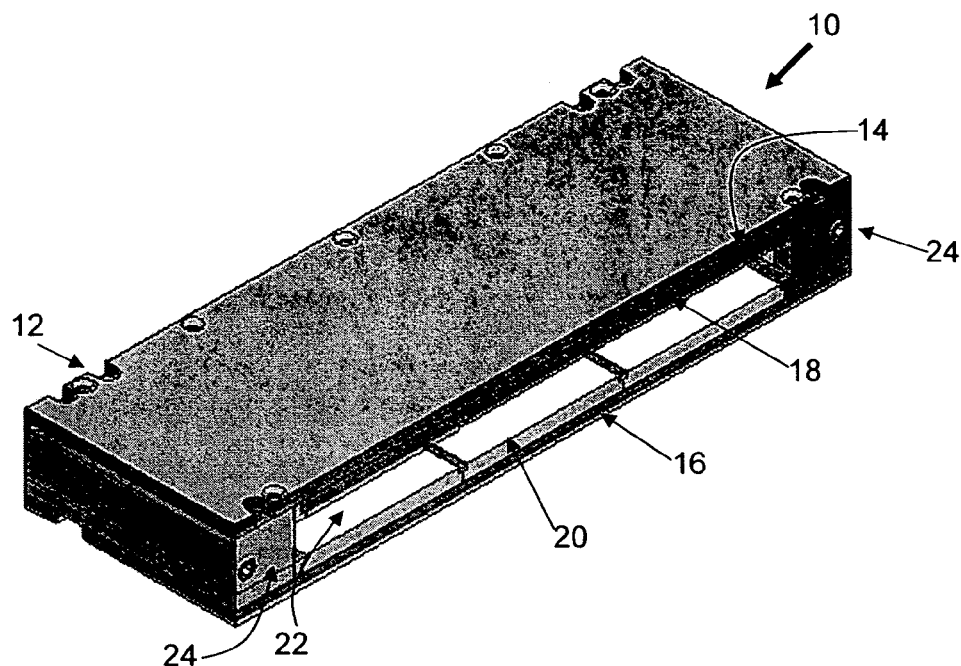
FIG. 1 is an isometric view of a magnet assembly of a linear motor that incorporates a cooling apparatus according to a first preferred embodiment of the invention.

FIG. 1 is an isometric view of a magnet assembly of a linear motor 10 comprising a coil assembly and a magnet assembly that incorporates a cooling apparatus according to a first preferred embodiment of the invention. The magnet assembly generally comprises a magnet housing support 12 for supporting first and second magnet holders 14, 16, on which first and second permanent magnets 18, 20 are respectively mounted. The first and second permanent magnets 18, 20 are mounted with opposite poles facing each other so as to form a substantially uniform magnetic field across a gap 22 therebetween. A coil assembly (see FIG. 2) is disposed in the gap 22 between the permanent magnets 18, 20 of the magnet assembly and is configured to be driven substantially along a plane that is parallel to the opposing surfaces of the permanent magnets 18, 20.

A cooling apparatus, which may be in the form of air knife assemblies 24 for discharging compressed cooling air into the gap 22 between the coil assembly and the magnet assembly, are mounted to the magnet housing support 12 at opposite ends of the first and second magnet holders 14, 16 to introduce cooling air into the gap 22 from both ends of the linear motor 10.

FIG. 2 is a cross-sectional view of the linear motor 10 incorporating the cooling apparatus according to the first preferred embodiment of the invention. It shows a coil assembly, such as a movable coil bracket 26 on which current-carrying coils are mounted, which is disposed within the gap 22. The coil bracket 26 is configured to be movable within the gap 22 in directions parallel to the surfaces of the first and second permanent magnets 18, 20.

In order to cool the coil bracket 26, which is generating heat during operation, the air knife assemblies 24 include air nozzles 28 for injecting compressed cooling air into an air chamber 29 of the cooling apparatus, which in turn transmits the cooling air into the gap 22 through a narrow compressed air inlet 30. The compressed air is discharged in a direction directly towards the gap 22, instead of transversely to the gap as in the prior art.

There is an inclined surface 31 extending from the narrow compressed air inlet 30, and it is sloping at an obtuse angle away from the discharge direction of the compressed air towards an atmospheric air inlet 32. The atmospheric air inlet 32 serves as a conduit for atmospheric air to be entrained into the gap 22. With the injection of compressed cooling air into the gap 22 at a sufficient velocity, air from the atmosphere will be further drawn into the gap 22, as explained below.

FIG. 3 is an enlarged cross-sectional view of the cooling apparatus illustrated in FIG. 2. The air nozzle 28 introduces compressed cooling air 33 into the air chamber 29. The pressurized cooling air 33 is forced at high velocity to flow through the narrow compressed air inlet 30 in order to enter the gap 22. This causes an area of low pressure to be formed next to the compressed air inlet 30.

The inclined surface 31 next to the compressed air inlet 30 which leads to the atmospheric air inlet 32 serves to draw entrained air 34 along the inclined surface 31 into the area of low pressure next to the compressed air inlet 30, and hence into the gap 22. The entrained air 34 mixes with the pressurized cooling air 33 emerging from the compressed air inlet 30, whereby to amplify the air flow. The resultant cooling air flow 36 is thus amplified to result in more efficient cooling. Furthermore, by directing the initial pressurized cooling air 33 directly into the gap 22, loss of cooling air to the atmosphere can be minimized, thereby further improving efficiency of the cooling apparatus.

Figure 4:
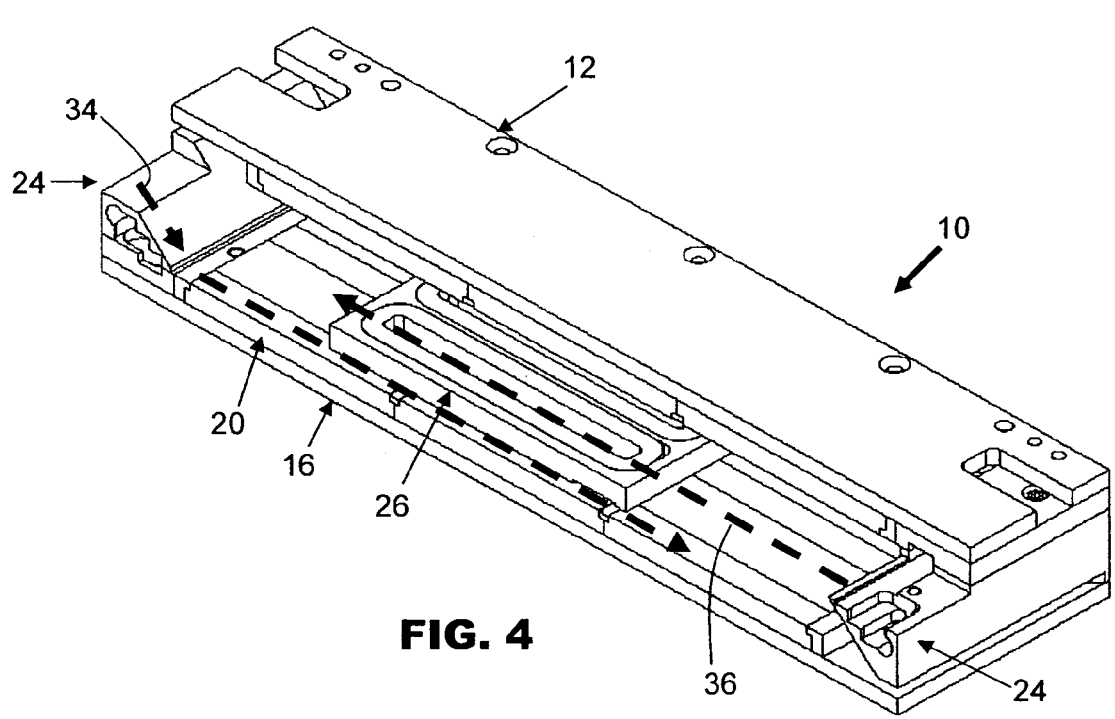
FIG. 4 is an isometric view of the linear motor with part of a magnet assembly removed to partially expose a movable coil assembly of the linear motor.

FIG. 4 is an isometric view of the linear motor with part of a magnet assembly removed to partially expose the movable coil bracket 26 of the linear motor 10. It shows that entrained air 34 from the atmosphere is drawn into the gap 22 from both the air knife assemblies 24, each of which is located at an opposite end of the magnet assembly. The resultant amplified cooling air 36 is directly injected into the gap 22 from both ends of the linear motor 10 in directions that are substantially parallel to the motion path of the coil bracket 26, whereby to cool the coil bracket 26.

Figure 5:
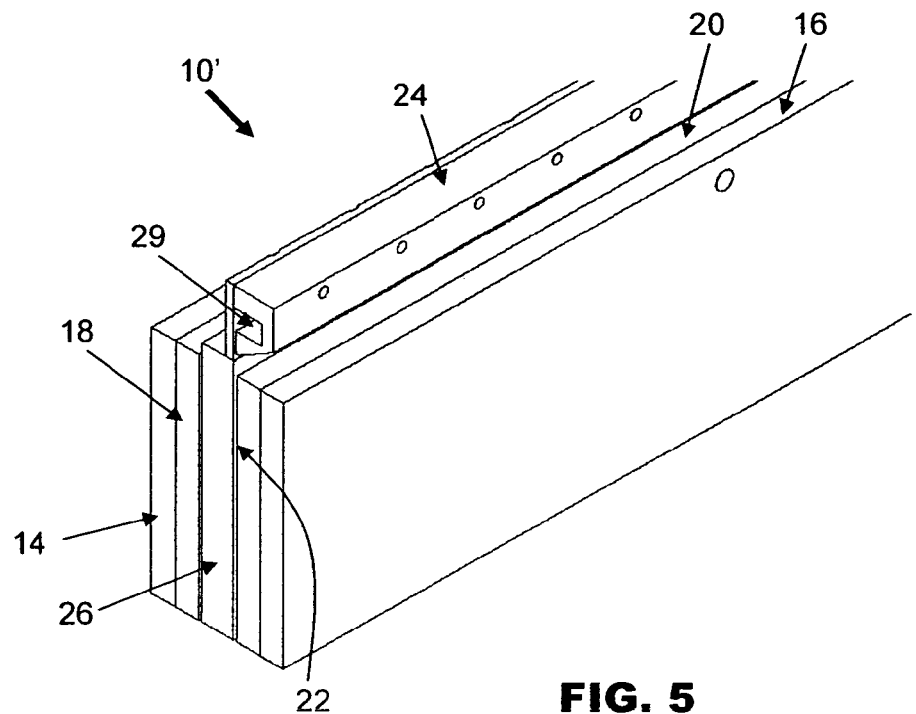
FIG. 5 is an isometric view of a linear motor that incorporates a cooling apparatus according to another preferred embodiment of the invention that is mounted onto a coil assembly.

FIG. 5 is an isometric view of a linear motor 10' that incorporates a cooling apparatus according to another preferred embodiment of the invention, which is in the form of an air knife assembly 24 mounted onto a coil assembly or coil bracket 26. First and second magnet holders 14, 16 are mounted with first and second permanent magnets 18, 20. The first and second permanent magnets 18, are mounted with opposite poles facing each other so as to form a substantially uniform magnetic field across a gap 22 therebetween. The coil bracket 26 is disposed in the gap 22 between the permanent magnets 18, 20 and is configured to be driven substantially along a plane that is parallel to the opposing surfaces of the permanent magnets 18, 20.

Since the cooling apparatus is mounted onto the coil bracket 26, the air knife assembly 24 is configured to be movable together with the coil bracket 26. This embodiment is especially useful in linear motor designs for which the length of the magnet assembly is significantly greater than the length of the coil bracket 26, such as where a greater range of motion of the coil bracket 26 is required. In this case, it may be more efficient to locate the cooling apparatus on the movable coil bracket 26 instead of being fixed on the magnet assembly so that the air knife assembly 24 is movable with the coil bracket 26 to constantly generate cooling air flow directly onto it.

In FIG. 5, the air knife assembly 24 is only mounted adjacent to one surface of the coil bracket 26, so that the air chamber 29 will inject cooling air 33 only onto one surface of the coil bracket 26. If required, the air knife assembly 24 may be mounted adjacent to both surfaces of the coil bracket 26 to inject cooling air 33 onto both surfaces of the coil bracket 26. In that case, two air chambers 29 may be implemented, with one air chamber 29 adjacent to each surface of the coil bracket 26. The discharge direction of the compressed cooling air is substantially perpendicular to a motion path of the coil assembly.

Figure 6:
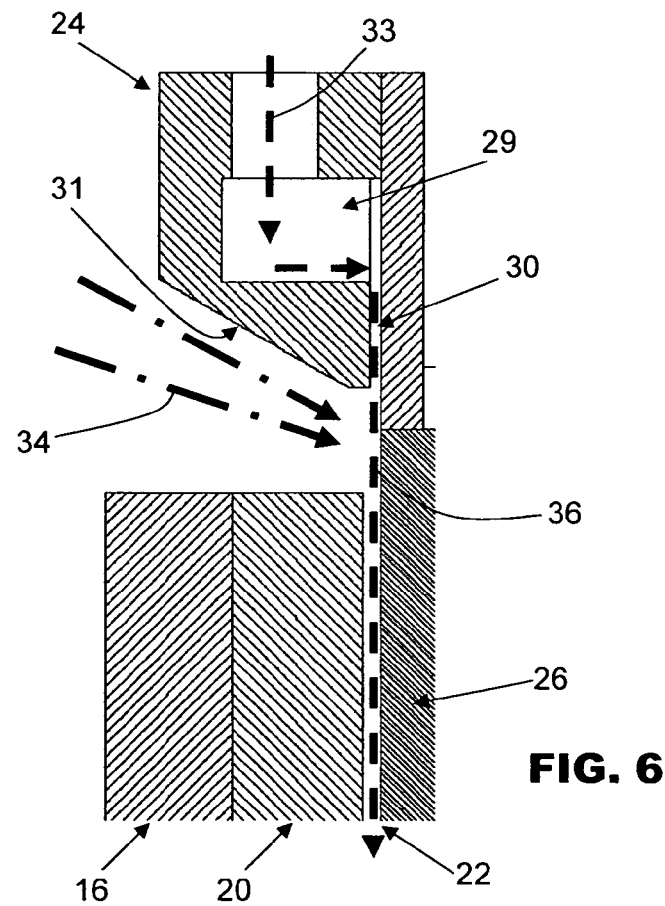
FIG. 6 is a cross-sectional view of the cooling apparatus of FIG. 5 which illustrates the amplification of cooling air flow onto a surface of the coil assembly.

FIG. 6 is a cross-sectional view of the cooling apparatus of FIG. 5 which illustrates the amplification of cooling air flow onto a surface of the coil bracket 26. The design of the air knife assembly 24 is similar to that of the first embodiment of the invention. Here, pressurized cooling air 33 is introduced into the air chamber 29, and then injected towards the gap 22 through a compressed air inlet 30 at high speed. An inclined surface 31 is positioned next to the compressed air inlet 30.

The high speed of the pressurized cooling air 33 injected through the compressed air inlet 30 creates an area of low pressure. The inclined surface 31 serves to promote the entrainment of atmospheric air along the inclined surface 31 into the region of low pressure. The entrained air 34 is mixed with the pressurized cooling air 33 emerging from the compressed air inlet 30 resulting in an amplified air flow 36 into the gap 22.

Similar to the first embodiment of the invention, the injection of pressurized cooling air 33 directly onto the surface of the coil bracket 26 minimizes the loss of cooling air 33 into the atmosphere. Instead, the inclined surface 31 and the region of low pressure around the opening of the compressed air inlet 30 entrains air from the atmosphere and results in a significantly amplified air flow 36 directly into the gap 22. Accordingly, the cooling system is more efficient than the prior art air cooling systems described above.

The invention described herein is susceptible to variations, modifications and/or addition other than those specifically described and it is to be understood that the invention includes all such variations, modifications and/or additions which fall within the spirit and scope of the above description.

The invention claimed is:

1. A cooling apparatus for a linear motor comprising a coil assembly, a magnet assembly and a gap formed therebetween, the cooling apparatus comprising:
   a compressed air inlet positioned to discharge compressed air in a direction directly towards the gap between the coil assembly and magnet assembly; and
   an inclined surface extending from the compressed air inlet and sloping at an obtuse angle away from the discharge direction of the compressed air;
   wherein the compressed air inlet is configured to discharge the compressed air at a sufficient velocity so as to entrain atmospheric air along the inclined surface to amplify the compressed air that is discharged.

2. The cooling apparatus as claimed in claim 1, further comprising an air chamber adjacent to the compressed air inlet for receiving compressed air from an air supply source and transmitting it to the compressed air inlet.

3. The cooling apparatus as claimed in claim 1, wherein the compressed air inlet is mounted onto the magnet assembly.

4. The cooling apparatus as claimed in claim 3, wherein the compressed air inlet comprises two air knives, each located at an opposite end of the magnet assembly to introduce compressed air into the gap.

5. The cooling apparatus as claimed in claim 3, wherein the inclined surface extends from the compressed air inlet and is connected to an atmospheric air inlet serving as a conduit for atmospheric air to be entrained towards the compressed air inlet.

6. The cooling apparatus as claimed in claim 3, wherein the discharge direction of the compressed air is substantially parallel to a motion path of the coil assembly.

7. The cooling apparatus as claimed in claim 1, wherein the compressed air inlet is mounted onto the coil assembly and is configured to be movable therewith.

8. The cooling apparatus as claimed in claim 7, wherein the compressed air inlet is configured to generate compressed air onto only one surface of the coil assembly.

9. The cooling apparatus as claimed in claim 7, wherein the discharge direction of the compressed air is substantially perpendicular to a motion path of the coil assembly.

10. Method for cooling a linear motor comprising a coil assembly a magnet assembly and a gap formed therebetween, comprising the steps of:
    providing a compressed air inlet and arranging it to discharge compressed air in a direction directly towards the gap between the coil assembly and magnet assembly;
    providing an inclined surface extending from the compressed air inlet and sloping at an obtuse angle away from the discharge direction of the compressed air; and
    discharging compressed air directly towards the gap at a sufficient velocity so as to entrain atmospheric air along the inclined surface to amplify the compressed air that is discharged.

11. The method as claimed in claim 10, further comprising the step of receiving compressed air from an air supply source into an air chamber adjacent to the compressed air inlet and transmitting such compressed air to the compressed air inlet.

12. The method as claimed in claim 10, wherein the compressed air inlet is mounted onto the magnet assembly.

13. The method as claimed in claim 12, further comprising the step of generating compressed air from two opposite ends of the magnet assembly to introduce compressed air into the gap.

14. The method as claimed in claim 12, further comprising the step of entraining atmospheric air to the inclined surface through an atmospheric air inlet connected to the inclined surface that serves as a conduit for atmospheric air to be entrained towards the compressed air inlet.

15. The method as claimed in claim 12, wherein the discharge direction of the compressed air is substantially parallel to a motion path of the coil assembly.

16. The method as claimed in claim 10, wherein the compressed air inlet is mounted onto the coil assembly and is configured to be movable therewith.

17. The method as claimed in claim 16, wherein the step of discharging compressed air comprises discharging compressed air onto only one surface of the coil assembly.

18. The method as claimed in claim 16, wherein the discharge direction of the compressed air is substantially perpendicular to a motion path of the coil assembly.

* * * * *